United States Patent
Kim et al.

(10) Patent No.: US 8,897,258 B2
(45) Date of Patent: Nov. 25, 2014

(54) METHOD OF TRANSMITTING DATA FOR REDUCING INTERFERENCE IN HIERARCHICAL CELL STRUCTURE

(75) Inventors: Juhee Kim, Daejeon-si (KR); Jae Sun Cha, Daejeon-si (KR); Kwang Jae Lim, Daejeon-si (KR); Soojung Jung, Daejeon-si (KR); Eunkyung Kim, Seoul (KR); Hyun Lee, Daejeon-si (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 764 days.

(21) Appl. No.: 12/836,949

(22) Filed: Jul. 15, 2010

(65) Prior Publication Data

US 2011/0013600 A1   Jan. 20, 2011

(30) Foreign Application Priority Data

Jul. 15, 2009   (KR) .................. 10-2009-0064315
Jul. 14, 2010   (KR) .................. 10-2010-0067695

(51) Int. Cl.
| | |
|---|---|
| H04W 4/00 | (2009.01) |
| H04W 28/04 | (2009.01) |
| H04L 5/00 | (2006.01) |
| H04L 12/28 | (2006.01) |
| H04W 88/08 | (2009.01) |
| H04W 84/04 | (2009.01) |
| H04W 24/00 | (2009.01) |
| H04W 24/10 | (2009.01) |
| H04W 92/20 | (2009.01) |

(52) U.S. Cl.
CPC .............. *H04W 28/04* (2013.01); *H04W 88/08* (2013.01); *H04W 84/045* (2013.01); *H04W 24/00* (2013.01); *H04W 24/10* (2013.01); *H04W 92/20* (2013.01); *H04L 5/0085* (2013.01); *H04L 5/0007* (2013.01); *H04L 5/0096* (2013.01); *H04L 5/006* (2013.01)
USPC .......................................... 370/331; 370/400

(58) Field of Classification Search
None
See application file for complete search history.

(56) References Cited

U.S. PATENT DOCUMENTS

| | | | | |
|---|---|---|---|---|
| 8,504,025 | B2 * | 8/2013 | Kim et al. ...................... | 455/434 |
| 8,548,484 | B2 * | 10/2013 | Lee et al. ....................... | 455/450 |
| 2005/0277415 | A1 * | 12/2005 | Hamalainen et al. .......... | 455/436 |
| 2007/0010251 | A1 * | 1/2007 | Cho et al. ....................... | 455/436 |
| 2009/0005099 | A1 | 1/2009 | Jung et al. | |
| 2009/0275319 | A1 * | 11/2009 | Aoyama et al. ............... | 455/418 |
| 2009/0280819 | A1 | 11/2009 | Brisebois et al. | |
| 2009/0285113 | A1 * | 11/2009 | Yavuz et al. ................... | 370/252 |
| 2009/0291687 | A1 * | 11/2009 | Vachhani et al. .............. | 455/436 |
| 2010/0222059 | A1 * | 9/2010 | Pani et al. ...................... | 455/436 |
| 2010/0233962 | A1 * | 9/2010 | Johansson et al. ........... | 455/63.1 |
| 2010/0311349 | A1 * | 12/2010 | Koo et al. .................. | 455/67.11 |
| 2011/0014920 | A1 * | 1/2011 | Nylander et al. .............. | 455/442 |
| 2011/0092151 | A1 * | 4/2011 | Brisebois et al. ................. | 455/1 |
| 2011/0116476 | A1 * | 5/2011 | Lee et al. ....................... | 370/331 |
| 2012/0329382 | A1 * | 12/2012 | Brisebois et al. ................. | 455/1 |

* cited by examiner

*Primary Examiner* — Eunsook Choi
(74) *Attorney, Agent, or Firm* — Staas & Halsey LLP (57) ABSTRACT

A method of transmitting data for reducing interference in a hierarchical cell structure including a macro base station (BS) providing multi carriers and a femto BS providing a single carrier includes performing a channel scan within an interfered carrier to acquire channel state information and neighbor femto BS information if interference with the femto BS occurs; transmitting a channel measurement report including the channel state information and the neighbor femto BS information to the macro BS; and transmitting data through a carrier changed by receiving carrier change information from the macro BS.

10 Claims, 6 Drawing Sheets

METHOD OF TRANSMITTING DATA FOR REDUCING INTERFERENCE IN HIERARCHICAL CELL STRUCTURE

CROSS-REFERENCE TO RELATED APPLICATIONS

This application claims the benefit of priority of Korean Patent Application No. 10-2009-0064315 filed on Jul. 15, 2009 and Korean Patent Application No. 10-2010-0067695 filed on Jul. 14, 2010, which are incorporated by reference in their entirety herein.

BACKGROUND

1. Field of the Invention

The present invention relates to wireless communications, and more particularly to a method of transmitting data for reducing interference in a hierarchical cell structure.

2. Related Art

Along with development of communications and a spread of multimedia technology, various large-capacity transmission technologies have been applied to a wireless communication system. A method of assigning more frequency resources has been introduced as a method for increasing wireless capacity. But there is a limit to assign more frequency resources among restricted frequency resources to many users. One of methods for more efficiently utilizing the restricted frequency resources, there is a method of making a small cell. If the size of the cell is made small, the number of users one base station has to give service is decreased, so that the base station can assign more frequency resources to users. As the size of the cell is made small, it is possible to offer better large-capacity service to many users.

In an institute of electrical and electronics engineers (IEEE) 802.16 task group that chooses the next-generation air interface standards and a nonprofit worldwide interoperability for microwave access (WiMAX) forum that provides service and network standards for a broadband wireless connection system based on IEEE 802.16, standardization has been being achieved for a wireless connection system supporting a femto-cell to enhance efficiency of the system and improve quality of service (QoS) under an indoor environment. The WiMAX forum defines a femto base station as a low-power inexpensive base station connected to an Internet protocol (IP) network through a fixed wireless link or a local broadband wired link. The femto base station is connected to the IP network spread in a home or an office, and accesses a core network of a mobile communication system through the IP network, thereby providing mobile communication service. That is, the femto base station may be connected to the core network of the mobile communication system through a digital subscriber line (DSL). A user of the mobile communication system may receive the service in the outdoors through the existing macro-cell, but receive the service in the indoors through the femto-cell. The femto-cell improves indoor coverage of the mobile communication system by making up for that the service of the existing macro-cell becomes deteriorated in a building, and provides the service intended for the a specific user, thereby providing voice and data service of high quality. Further, the femto-cell can provide a new service not given in the macro-cell, and the spread of the femto-cell may cause fixed-mobile convergence (FMC) to be accelerated and an industrial-based cost to be reduced.

The femto BS may be installed by a home user or a small office home office (SOHO) user. The femto BS undergoes Plug & Play and is capable of providing service like that of the macro BS as well as an idle mode. Several tens to several hundreds of femto BSs may be installed within a cell zone of the macro BS, and the femto BS can improve service of a area without coverage instead of the existing relay and lighten load of the macro BS. However, a cell region of the femto BS may be overlapped with that of the macro BS or another femto BS, and thus interference may occur between the femto-cells or between the femto-cell and the macro-cell. In particular, if the femto BS and the macro BS use the same frequencies or neighbor frequencies, not only a user of the femto BS but also a user of the macro BS around the femto BS may be under serious interference. To reduce the interference of the femto BS, there has been proposed a fractional frequency reuse (FFR) method on a level of cells and transmission control of the femto BS, but there has not been proposed a method of reducing interference with respect to individual users of a cell boundary.

Accordingly, there is required a method of reducing interference with regard to individual users of the cell boundary in the femto BS.

SUMMARY

The present invention provides a method of reducing interference, based on individual users, with regard to users of a cell boundary in a femto BS.

In an aspect, there is provided method of transmitting data for reducing interference in a hierarchical cell structure including a macro base station (BS) providing multi carriers and a femto BS providing a single carrier, the method including: performing a channel scan within an interfered carrier to acquire channel state information and neighbor femto BS information if interference with the femto BS occurs; transmitting a channel measurement report including the channel state information and the neighbor femto BS information to the macro BS; and transmitting data through a carrier changed by receiving carrier change information from the macro BS.

In another aspect, there is provided a method of transmitting data for reducing interference in a hierarchical cell structure including a macro base station (BS) providing multi carriers and a femto BS providing a single carrier, the method including: receiving a channel measurement report including channel state information of a carrier interfered with the femto BS and neighbor femto BS information from user equipment (UE); and transmitting data through a carrier changed by changing a carrier of the UE on the basis of the channel measurement report.

Thus, it is possible to reduce interference with a neighbor femto-cell and improve efficiency of transmitting and receiving data in a hierarchical cell structure including a macro cell and a femto cell.

DESCRIPTION OF EXEMPLARY EMBODIMENTS

Below, exemplary embodiments of the present invention will be described in detail with reference to accompanying drawings so as to be easily realized by a person having ordinary knowledge in the art. However, the present invention may be embodied in various forms without being limited to the exemplary embodiments set forth herein. In the drawings, unrelated parts are omitted for clearly explaining the present invention, and like reference numerals refer to like elements throughout. Further, descriptions of a part that can be easily appreciated by those skilled in the art are omitted.

The following technology may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented by radio technology such as institute of electrical and electronics engineers (IEEE) 802.11 (Wi-Fi), IEEE 802.16e (WiMAX), IEEE 802-20, evolved UTRA (E-UTRA), etc. The UTRA is a part of a universal mobile telecommunications system (UMTS). 3rd generation partnership project (3GPP) long term evolution (LTE) is a part of evolved UMTS (E-UMTS) using the E-UTRA, which employs the OFDMA for a downlink but the SC-FDMA for an uplink. IEEE 802.16m is evolved from IEEE 802.16e.

Figure 1:
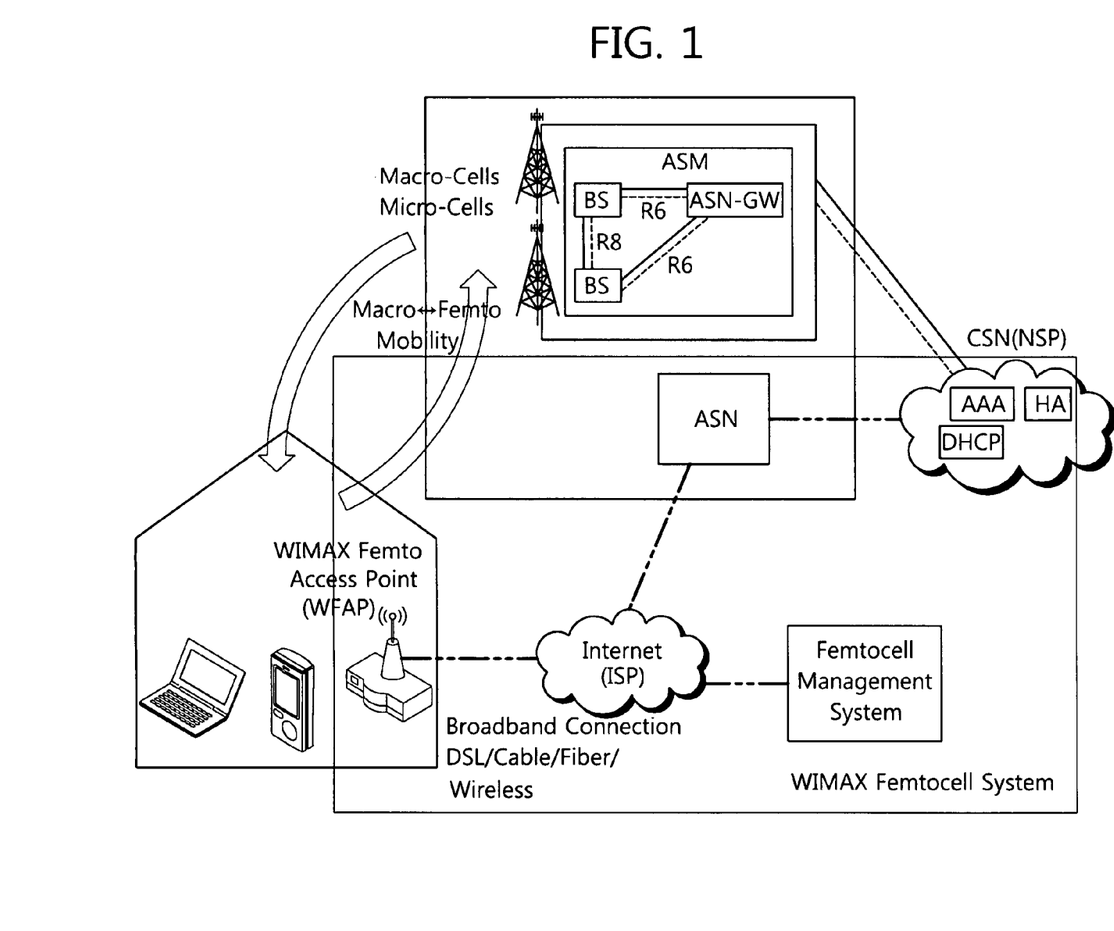
FIG. 1 is a block diagram of a wireless communication system.

FIG. 1 shows an example of a WiMAX system that supports a femto-cell.

Referring to FIG. 1, a general wireless communication system includes a user equipment (UE) and a base station (BS). The wireless communication system is widely deployed to provide various communication services such as voice, packet data, etc.

The UE may be fixed or mobile, which may be also called a mobile station (MS), a user terminal (UT), a subscriber station (SS), a wireless device, etc. The base station generally refers to a fixed station that communicates with the UE, which may be also called a node-B, a base transceiver system, an access point, etc. One base station may include one or more cells.

The base station may be classified into a femto BS and a macro BS according to cell coverage or location. The cell of the femto BS is smaller than the cell of the macro BS. The cell of the femto BS may be entirely or partially overlapped with the cell of the macro BS. Thus, a structure where a small cell is overlappingly located within a large cell is called a hierarchical cell structure. The femto BS may be also called a femto-cell, a home node-B, a closed subscriber group (CSG), a WiMAX femto access point (WFAP), etc. The macro BS may be called a macro-cell as opposed to the femto-cell.

The UE that belongs to the femto BS is called a femto UE, and the UE that belongs to the macro BS is called a macro UE. The femto UE can become the macro UE through a handover to the macro BS, and the macro UE can become the femto UE through a handover to the femto BS.

In the femto BS, broadband connection to Internet provided by an Internet service provider (ISP) is possible through a digital subscriber line (DSL), a cable, an optical fiber, wireless, etc. The femto BS may be connected to a femto-cell management system and an access service network (ASN) of a mobile communication system through Internet. The femto management system may perform registration, authentication, security procedures, etc. of the femto BS so that the femto BS can access a connectivity service network of the mobile communication system.

The femto BS for an open subscriber group (OSG) operates like the macro BS when calling the UE. The femto BS for a closed subscriber group (CSG) may broadcast a paging message to only the UE that belongs to a relevant CSG. To support the femto BS, the OSG and the CSG may be defined by consulting 'system description document(SDD) of IEEE 802.16 task group m.'

Hereinafter, the downlink means a transmission course from the base station to the UE, and the uplink means a transmission course from the UE to the base station. In the case of the downlink, a transmitter may be a part of the base station, and a receiver may be a part of the UE. In the case of the uplink, the transmitter may be a part of the UE, and the receiver may be a part of the base station.

Figure 2:
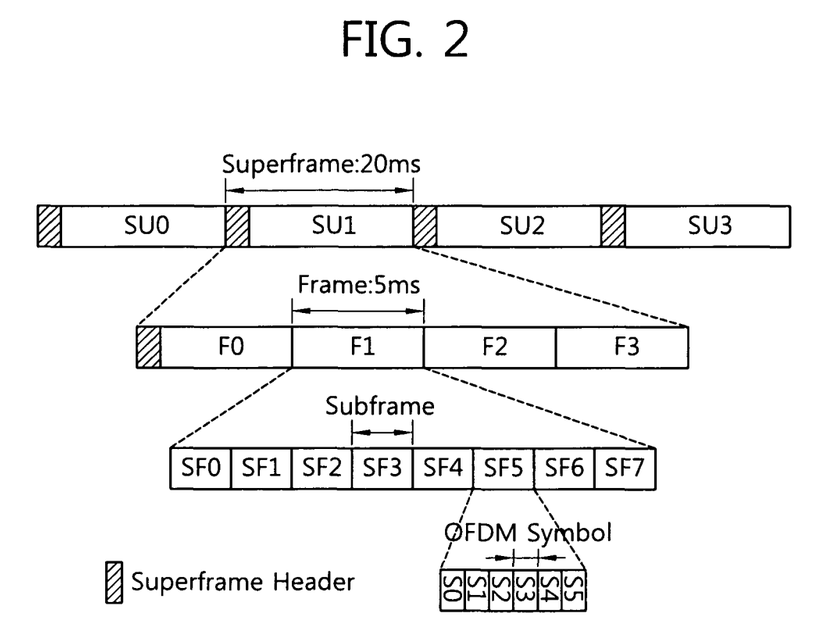
FIG. 2 shows an example of a frame structure.

FIG. 2 shows an example of a frame structure, which may show a frame structure of at least one of the macro-cell and the femto-cell in the hierarchical cell structure.

Referring to FIG. 2, a superframe includes a superframe header SFH and four frames F0, F1, F2 and F3. For example, each superframe has a length of 20 ms and each frame has a length of 5 ms, but not limited thereto. The superframe header may be arranged at the head of the superframe, and a common control channel may be assigned to the superframe header. The common control channel is a channel used for transmitting information about frames constituting the superframe or control information utilized in common like system information by all UEs within the cell. Further, a synchronization channel may be arranged within the superframe header or neighboring to the superframe so as to transmit a synchronization signal. The synchronization signal may represent cell information such as a cell identifier (ID).

One frame includes a plurality of subframes SF0, SF1, SF2, SF3, SF4, SF5, SF6 and SF7. Each subframe may be used for uplink or downlink transmission. The subframe may include 6 or 7 OFDM symbols, but this is nothing but an example. Here, a time division duplexing (TDD) method or a frequency division duplexing (FDD) method may be applied to the frame. In the TDD method, each subframe is used for the uplink or downlink transmission in different times at the same frequency. That is, the subframes within the frame of the TDD method are divided into an uplink subframe and a downlink subframe in a time domain. In the FDD method, each subframe is used for the uplink and downlink transmission in different frequencies at the same time. That is, the subframes within the frame of the FDD method are divided into an uplink subframe and a downlink subframe in a frequency domain. The uplink transmission and the downlink transmission may be performed simultaneously while occupying different frequency bands from each other. Each subframe may include a subframe header. The subframe header may contain wireless-resource assignment information or the like.

The subframe includes at least one frequency partition. The frequency partition includes at least one physical resource unit (PRU). The frequency partition may include a localized PRU and/or a distributed PRU. The frequency partition may be used for different purposes of fractional frequency reuse (FFR) or multicast and broadcast services (MBS).

The PRU is defined as a basic physical unit for resource assignment, which includes a plurality of successive OFDM symbols and a plurality of successive subcarriers. The number of OFDM symbols included in the PRU may be equal to the number of OFDM symbols included in one sub frame. For example, if one subframe includes 6 OFDM symbols, the PRU may be defined as 18 subcarriers and 6 OFDM symbols. A logical resource unit (LRU) is a basic logical unit for distributed resource assignment and localized resource assignment. The LRU is defined as a plurality of OFDM symbols and a plurality of subcarriers, and includes pilots used in the PRU. Thus, in one LRU, a proper number of subcarriers depends on the number of assigned pilots.

A logical distributed resource unit (DRU) may be used for acquiring a frequency diversity gain. The DRU includes a subcarrier group distributed within one frequency partition. The size of the DRU is the same as the size of the PRU. A minimum unit forming the DRU is one subcarrier.

A logical contiguous resource unit (CRU) may be used for acquiring a frequency selective scheduling gain. The CRU includes a localized subcarrier group. The size of the CRU is the same as the size of the PRU.

Now, a user's carrier management method for reducing interference with regard to a cell management scenario based on a user operation mode of the macro BS providing multi carriers in a wireless communication system supporting the femto BS will be described. More specifically, methods of reducing interference with the macro BS providing the multi carriers will be descried with respect to a first scenario where the macro UE operates on a multi-carrier mode and a second scenario where the macro UE operates a single-carrier mode.

<First Scenario>

Figure 3:
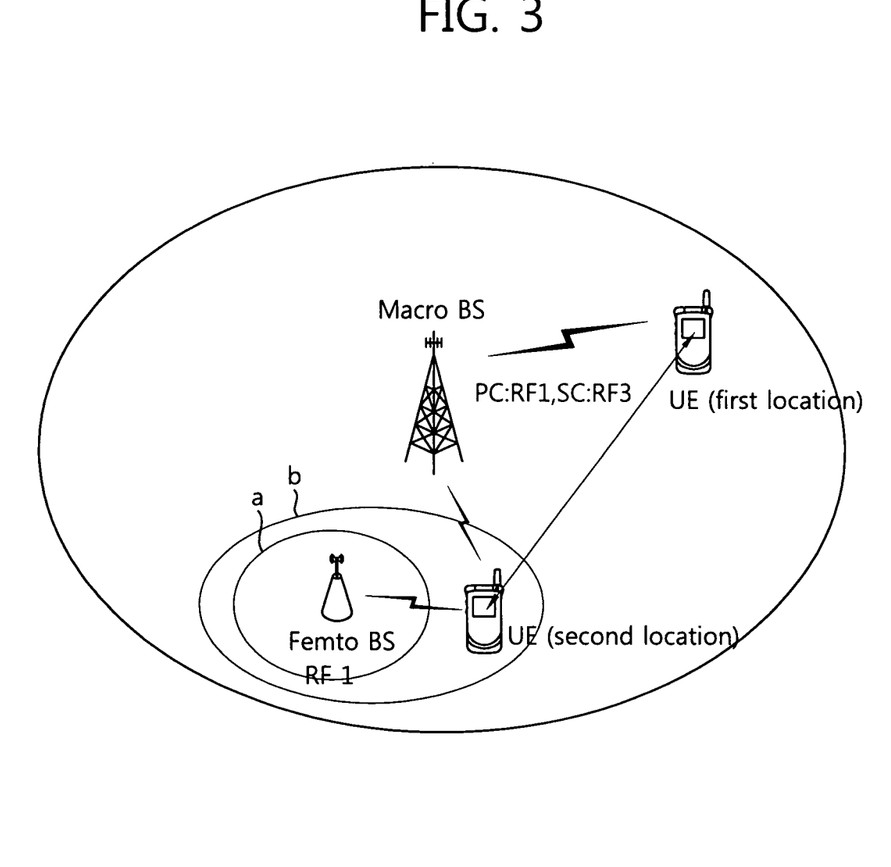
FIG. 3 shows an example of mobility of macro user equipment (UE) that operates on a multi-carrier mode in a hierarchical cell structure including a macro base station (BS) providing multi carriers and a femto BS providing a single carrier.
Figure 4:
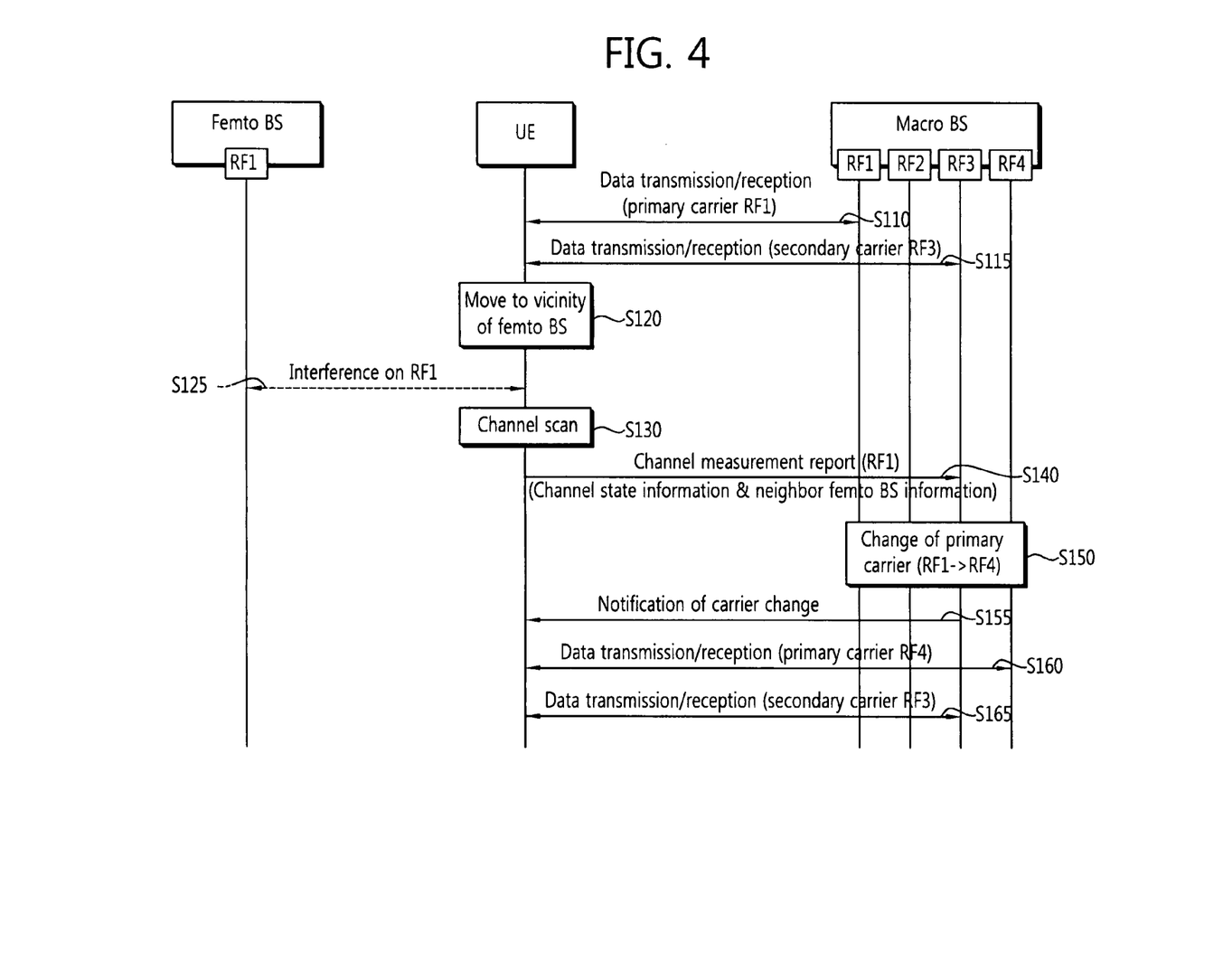
FIG. 4 shows a process of transmitting and receiving data for reducing interference in a scenario of FIG. 3.

FIG. 3 shows an example of mobility of a macro UE that operates on the multi-carrier mode in a hierarchical cell structure where a macro BS provides multi carriers and a femto BS provides a single carrier. FIG. 4 shows a process of transmitting and receiving data for reducing interference in a scenario of FIG. 3.

Referring to FIG. 3 and FIG. 4, assume that the macro BS manages four carriers RF1, RF2, RF3 and RF4. The macro UE employs the carrier RF1 as a primary carrier (PC) to transmit and receive data to and from the macro BS (S110), and employs the carrier RF3 as a secondary carrier (SC) to transmit and receive data to and from the macro BS (S115). In other words, the macro UE operates on the multi-carrier mode where a plurality of carriers are used to transmit and receive data to and from the macro BS. Then, suppose that the femto BS is located within the cell region of the macro BS and provides services through the carrier RF1. That is, some carriers among the plurality of carriers used in the macro BS are shared with the femto BS. A method of sharing a part of frequency bands between the macro BS and the femto BS may be called a partial co-channel method. The macro UE can transmit and receive data to and from the macro BS without interference with the femto BS at a first location not adjacent to the cell region of the femto BS.

The macro UE may move to a second location adjacent to the cell region of the femto BS (S120). If the macro UE makes an entry not into a range 'a' where a handover to the femto BS can be performed but into a range where interference with the femto BS may occur, the macro UE may not perform the handover to the femto BS and be seriously interfered with the femto BS. Also, if the femto BS is a CSG femto BS which allows access only to a selected UE and the macro UE does not belong to the CSG, then the macro UE may be seriously interfered with the femto BS when the macro UE makes an entry into the cell region of the femto BS.

The macro UE using the primary carrier RF1 in data communication is interfered because the carrier RF1 is also used by the femto BS (S125). At the same time, the femto BS is also interfered because the primary carrier RF1 is also used by the macro UE.

The macro UE performs a channel scan if being interfered with the femto BS (S130). The macro UE may perform the channel scan within the carrier RF1 where the interference occurs. The channel scan means a process of measuring a channel state by receiving a pilot, a broadcast message, etc. through a corresponding channel and obtaining system information. The macro UE can measure the channel state of the carrier RF1 and acquire information about a neighbor femto BS.

The macro UE transmits a channel measurement report that contains channel state information on the carrier RF1 and neighbor femto BS information (S140). The neighbor femto BS information may include an ID of the femto BS or a preamble index of the femto BS. The neighbor femto BS information may be used when the macro BS selects the carrier to be assigned to the micro UE. The channel measurement report may be transmitted through the primary carrier RF1 or the secondary carrier RF3. Since the channel measurement report is on the primary carrier RF1, it may be transmitted through the primary carrier RF1. Further, the primary carrier RF1 is interfered with the femto BS, the channel measurement report on the primary carrier RF1 may be transmitted through the secondary carrier RF3.

The macro BS may change the primary carrier of the interfered macro UE on the basis of the channel measurement report transmitted from the macro UE (S150). If the femto BS is for a CSG and the UE does not belong to the CSG or does not want a handover to the femto BS, the macro BS may change the primary carrier to reduce interference with the macro UE. The macro BS can acquire the information about the femto BS located around the macro UE by receiving the neighbor femto BS information detected by the UE, and determine a frequency band of the primary carrier of the macro UE to be changed in consideration of the frequency of the used carrier, resource assignment, and power information of the neighbor femto BS. The macro BS can change the primary carrier of the macro UE into the carrier RF2 or RF4. In this exemplary embodiment, not the carrier RF1 of a neighbor frequency but the carrier RF4 of less interference is selected as the primary carrier of the macro UE.

The macro BS notifies the macro UE of the change of the carrier (S155). The notification about the change of the carrier may include carrier change information which indicates whether the changed carrier is the primary carrier or the secondary carrier and also indicates the frequency of the changed carrier. The notification about the change of the carrier also includes information for indicating a changing time when the carrier is changed. The notification about the change of the carrier may be transmitted through the secondary carrier RF3 or the primary carrier RF1 of before the change. The macro UE can receive the notification about the change of the carrier and acquire information about the frequency of the changed primary carrier and the changing time.

The macro BS and the macro UE can employ the changed primary carrier RF4 to reduce interference with the femto BS when transmitting and receiving data (S160). Also, the macro BS and the macro UE can employ the secondary carrier RF3 in transmitting and receiving data (S165).

In the foregoing embodiment, the change of the frequency of the primary carrier is introduced when the primary carrier of the macro UE is the same as the carrier of the femto BS. The same process as changing the primary carrier may be performed even when the frequency of the secondary carrier is changed because the secondary carrier of the macro UE is the same as the carrier of the femto BS. Alternatively, if both the primary carrier and the secondary carrier are interfered with the neighboring femto BS, the primary carrier and the secondary carrier are all changed in accordance with determination of the macro BS.

<Second Scenario>

Figure 5:
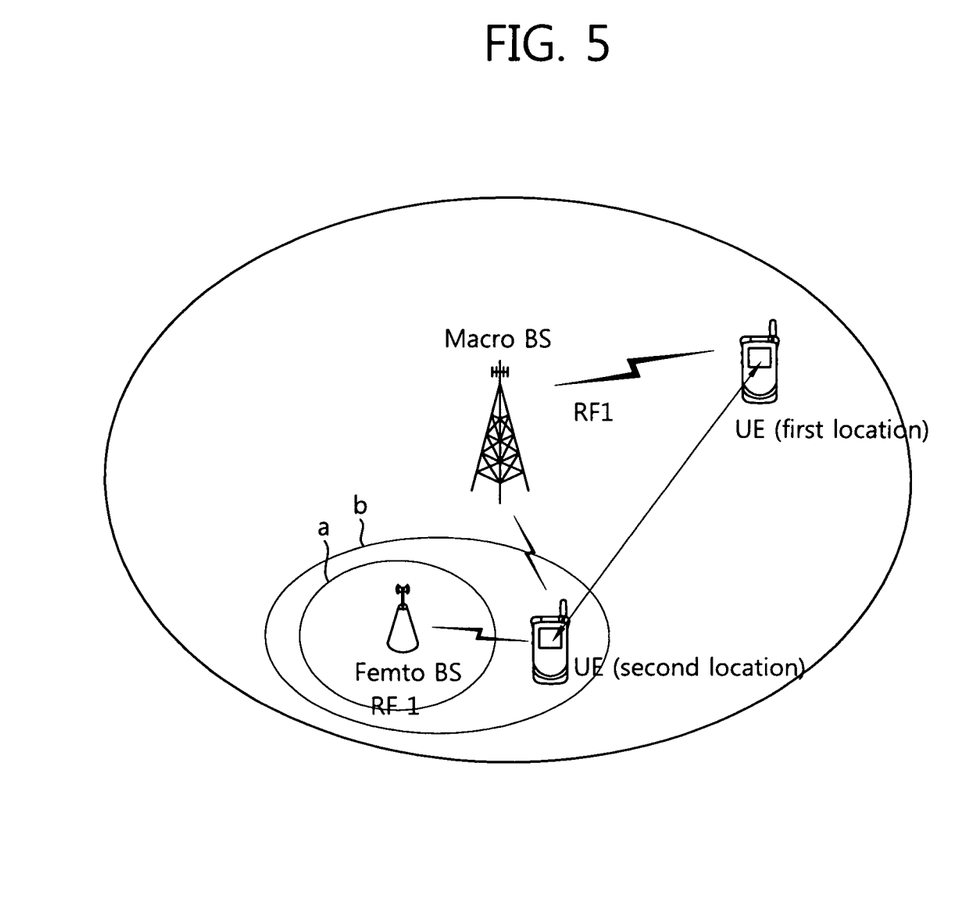
FIG. 5 shows an example of mobility of the macro UE that operates on a single-carrier mode in the hierarchical cell structure including the macro BS providing the multi carriers and the femto BS providing the single carrier.
Figure 6:
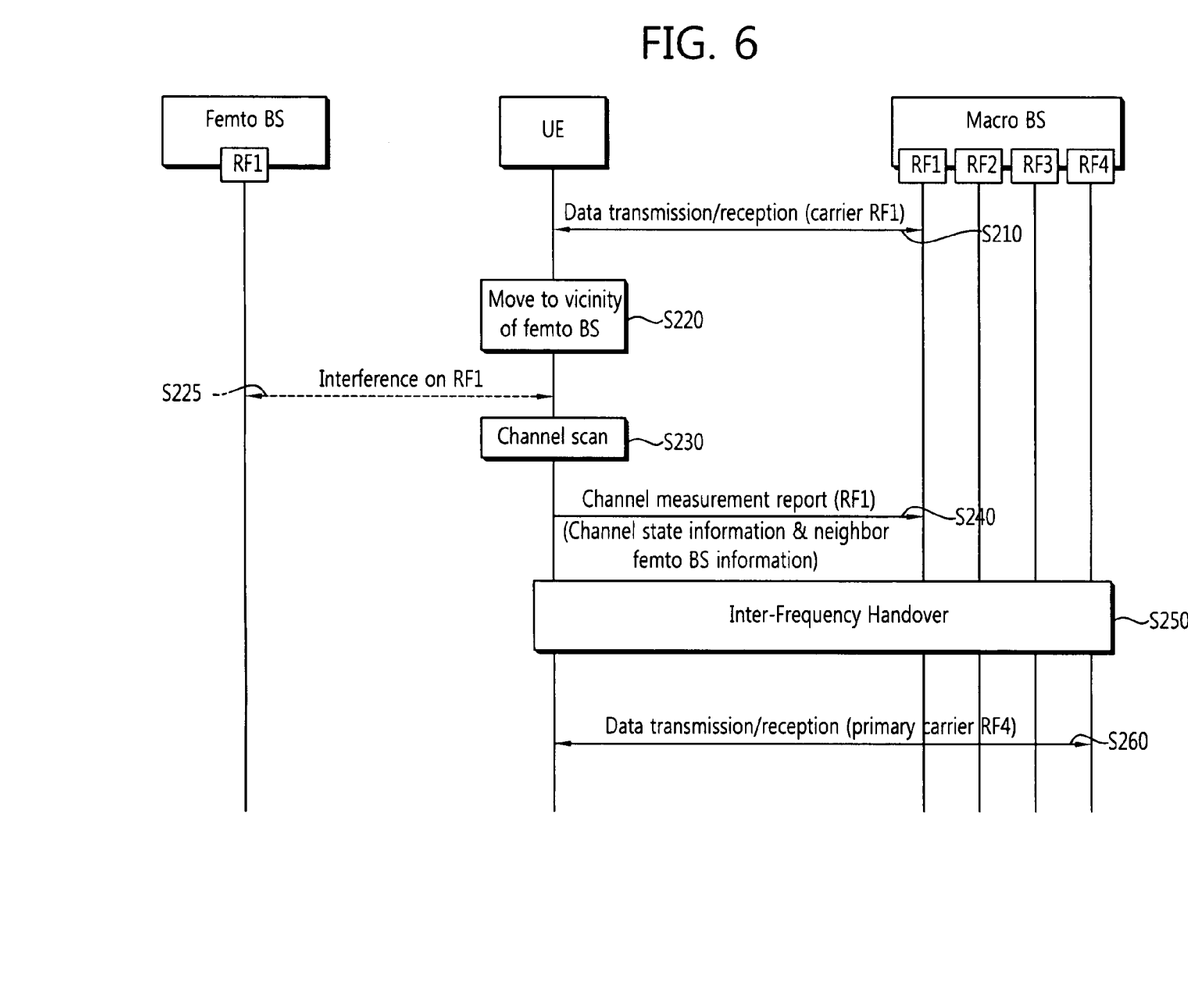
FIG. 6 shows a process of transmitting and receiving data for reducing interference in a scenario of FIG. 5.

FIG. 5 shows an example of mobility of the macro UE that operates on a single-carrier mode in the hierarchical cell structure including the macro BS providing the multi carriers and the femto BS providing the single carrier. FIG. 6 shows a process of transmitting and receiving data for reducing interference in a scenario of FIG. 5.

Referring to FIGS. 5 and 6, assume that the macro BS manages four carriers RF1, RF2, RF3 and RF4, and the macro UE employs the carrier RF1 to transmit and receive data to and from the macro BS (S210). In other words, the macro UE operates on the single-carrier mode where one carrier is used to transmit and receive data to and from the macro BS. At this time, suppose that the femto BS is located within a cell region of the macro BS and provides services through the carrier RF1. The macro UE can transmit and receive data to and from the macro BS without interference with the femto BS at a first location not adjacent to the cell region of the femto BS.

The macro UE may move to a second location adjacent to the cell region of the femto BS (S220). If the macro UE makes an entry not into a range 'a' where a handover to the femto BS can be performed but into a range 'b' where interference with the femto BS may occur, then the macro UE may not perform the handover to the femto BS and be seriously interfered with the femto BS. Also, if the femto BS is a CSG femto BS which allows access only to a selected UE and the macro UE does not belong to the CSG, the macro UE may be seriously interfered with the femto BS when the macro UE makes an entry into the cell region of the femto BS.

The macro UE using the carrier RF1 in data communication is interfered because the carrier RF1 is also used by the femto BS (S225). At this time, the femto BS is also interfered because the carrier RF1 is used by the macro UE.

The macro UE performs a channel scan if being interfered with the femto BS (S230). The macro UE may perform the channel scan within the carrier RF1 where the interference occurs. The macro UE can measure the channel state of the carrier RF1 and acquire neighbor femto BS information. Further, the macro UE may scan another frequency band for a inter-frequency handover within one cell. That is, the macro UE may measure the channel states of the carriers RF1 to RF4 managed by the macro BS.

The macro UE transmits a channel measurement report that contains channel state information and neighbor femto BS information (S240). The channel state information may include information about the channel state of the carrier RF1 where the interference occurs and the carriers RF2 to RF3 of other frequency bands managed by the macro BS. The neighbor femto BS information may include an ID of the femto BS or a preamble index of the femto BS. The channel measurement report may be referred to as a scanning report. The neighbor femto BS information may be considered when the macro BS selects a carrier to be assigned to the micro UE. The channel measurement report may be transmitted through the carrier RF1.

The macro BS performs an inter-frequency handover within one cell on the basis of the channel measurement report received from the macro UE (S250). That is, the macro BS can change the carrier of the macro UE being interfered. If the femto BS is for a CSG and the UE does not belong to the CSG or does not want a handover to the femto BS, then the macro BS may change the carrier of the macro UE to reduce interference in the macro UE. The macro BS can acquire the information about the femto BS located around the macro UE by receiving the neighbor femto BS information detected by the UE, and determine a frequency band of the carrier of the macro UE to be changed in consideration of the frequency of the used carrier, resource assignment, and power information of the neighbor femto BS.

The inter-frequency handover within one cell may be implemented depending on an initiated handover of the UE or an initiated handover of the BS after the UE scans another frequency band. A handover message for the inter-frequency handover within one cell may include a handover request message HO-REQ, a handover command message (HO-CMD) and a handover indication message (HO-IND).

TABLE 1 shows the handover messages.

| Message | Notes |
| --- | --- |
| HO-REQ | Indication of Intra-Cell inter-carrier handover Recommended target carrier information of the current serving BS |
| HO-CMD | Indication of Intra-Cell inter-carrier handover Recommended target carrier information of the current serving BS |
| HO-IND | Target carrier information of the current serving BS |

Regarding the beginning of handover at the BS, a macro BS transmits a handover request message to the macro UE. The handover request message indicates the inter-frequency handover within one cell and recommends a target carrier of the current serving BS. The macro UE that receives the handover request message from the macro BS scans the recommended target carrier. The macro UE transmits a handover information message containing information about the scanned target carrier to the macro BS. The macro BS transmits the handover command message indicating the inter-frequency handover within one cell to the macro UE. The handover command message may include target carrier information of the current serving BS.

Regarding the beginning of handover at the UE, a macro UE transmits the handover request message containing scan information about another frequency band to the macro BS. The handover request message may indicate the inter-frequency handover within one cell, and recommend the target carrier of the current serving BS. The macro BS determines carriers to be assigned to the macro UE and transmits the handover command message containing the target carrier information.

In the case that the UE receives multi-carrier configuration information, the target carrier information may include only a carrier index. If the UE does not receive the multi-carrier configuration information, the target carrier information may include information about a center frequency (e.g., a band class index and a channel index), a channel bandwidth, a carrier type (e.g., fully/partially configured), a duplexing mode, a preamble index, transmission power, etc. of the target carrier.

The macro BS can change the carrier of the macro UE into one of the carriers RF2, RF3 and RF4, and acquire information about the change of the carrier through the inter-frequency handover within one cell. Here, the carrier RF4 less interfered with the carrier RF1 is selected as the carrier of the macro UE.

The macro BS and the macro UE can employ the changed carrier RF4 to reduce interference with the femto BS when transmitting and receiving data (S260).

Thus, if the macro UE moves to the vicinity of the cell region of the femto BS and interferes with the femto BS, the macro BS is informed of the interference and the used carrier is changed, so that the interference with the femto BS can be reduced and data transmission of individual users can be improved in efficiency.

The foregoing all functions may be achieved by a microprocessor, a controller, a microcontroller, an application specific integrated circuit (ASIC), etc. based on software, program code or the like coded to implement the above functions. It will be appreciated by the explanation of the present invention that design, development and realization of the code are obvious to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting data for reducing interference in a hierarchical cell structure comprising a macro base station (BS) providing multi carriers and a femto BS providing a single carrier, the method comprising:
    scanning a channel of an interfered carrier to acquire channel state information and neighbor femto BS information only when interference with the femto BS occurs;
    transmitting a channel measurement report based on the scanning, the channel measurement report comprising the channel state information and the neighbor femto BS information to the macro BS;
    receiving carrier change information based on the channel measurement report from the macro BS, the carrier change information indicating change of the interfered carrier to a changed carrier; and
    transmitting data through the changed carrier.

2. The method of claim 1, wherein the neighbor femto BS information comprises an identifier (ID) of the femto BS or a preamble index of the femto BS.

3. The method of claim 1, further comprising performing a channel scan of a frequency band other than the interfered carrier for an inter-frequency handover within one cell.

4. The method of claim 3, wherein the inter-frequency handover within one cell is performed depending on an initiated handover of user equipment (UE) or an initiated handover of a BS.

5. The method of claim 4, wherein the initiated handover of the UE comprises indicating the inter-frequency handover within one cell and transmitting a handover request message comprising target carrier recommendation to the macro BS.

6. The method of claim 5, wherein the initiated handover of the UE comprises receiving a handover command message comprising target carrier information from the macro BS in response to the handover request message.

7. The method of claim 4, wherein the initiated handover of the BS comprises indicating the inter-frequency handover within one cell and receiving a handover request message recommending a target carrier of a current serving BS from the macro BS.

8. The method of claim 7, wherein the initiated handover of the BS comprises transmitting a handover information message comprising target carrier information to the macro BS in response to the handover request message.

9. The method of claim 3, wherein target carrier information for changing a carrier at the inter-frequency handover within one cell is given to the macro BS, the target carrier information comprising only a carrier index when receiving multi-carrier configuration information.

10. The method of claim 3, wherein target carrier information for changing a carrier at the inter-frequency handover within one cell is given to the macro BS, the target carrier information comprising information about a center frequency, a channel bandwidth, a carrier type, a duplexing mode, a preamble index, transmission power, etc. of the target carrier when receiving no multi-carrier configuration information.

* * * * *